US011239748B2

(12) United States Patent
Higashida et al.

(10) Patent No.: US 11,239,748 B2
(45) Date of Patent: Feb. 1, 2022

(54) WATER AREA APPARATUS

(71) Applicant: TOTO LTD., Kitakyushu (JP)

(72) Inventors: Madoka Higashida, Fukuoka (JP); Kandai Kawahara, Fukuoka (JP)

(73) Assignee: TOTO LTD., Kitakyushu (JP)

( * ) Notice: Subject to any disclaimer, the term of this patent is extended or adjusted under 35 U.S.C. 154(b) by 110 days.

(21) Appl. No.: 16/829,153

(22) Filed: Mar. 25, 2020

(65) Prior Publication Data

US 2020/0313547 A1 Oct. 1, 2020

(30) Foreign Application Priority Data

Mar. 29, 2019 (JP) .............................. JP2019-068198
Oct. 31, 2019 (JP) .............................. JP2019-198484
Dec. 13, 2019 (JP) .............................. JP2019-225516

(51) Int. Cl.
*H02M 1/42* (2007.01)
*H02P 7/18* (2006.01)
*A47K 13/30* (2006.01)
*E03D 9/08* (2006.01)
*E03D 5/01* (2006.01)

(52) U.S. Cl.
CPC ......... *H02M 1/4225* (2013.01); *A47K 13/305* (2013.01); *E03D 5/01* (2013.01); *E03D 9/08* (2013.01); *H02P 7/18* (2013.01)

(58) Field of Classification Search
CPC ...... H02M 1/4225; H02P 7/18; A47K 13/305; E03D 5/01; E03D 9/08

USPC ........................................................ 4/420.2
See application file for complete search history.

(56) References Cited

U.S. PATENT DOCUMENTS

| 5,250,907 | A | 10/1993 | Fukui |
| 2013/0091627 | A1 | 4/2013 | Kang |
| 2018/0371733 | A1 | 12/2018 | Childress et al. |

FOREIGN PATENT DOCUMENTS

| EP | 2800263 | 11/2014 |
| JP | 04-328471 | 11/1992 |
| JP | 04-368471 | 12/1992 |
| JP | 10-201248 | 7/1998 |
| JP | 2013-141344 | 7/2013 |
| JP | 2014-134004 | 7/2014 |
| JP | 2015-190269 | 11/2015 |
| JP | 2018-109336 | 7/2018 |
| JP | 2019-000422 | 1/2019 |
| WO | 2011/162559 | 12/2011 |

*Primary Examiner* — Tuan N Nguyen
(74) *Attorney, Agent, or Firm* — Amin, Turocy & Watson, LLP (57) ABSTRACT

A water area apparatus according to one aspect of embodiments includes: a first device; a second device whose power consumption is smaller than that of the first device; a Power Factor Correction (PFC) circuit that is connected to an Alternating-Current power supply, reduces harmonic current, and steps up a voltage to output the stepped-up voltage; and a regulator that is connected to the PFC circuit and steps down a voltage to obtain a constant voltage, wherein the voltage stepped up by the PFC circuit is applied to the first device, and the voltage stepped down by the regulator is applied to the second device.

5 Claims, 7 Drawing Sheets

WATER AREA APPARATUS

CROSS-REFERENCE TO RELATED APPLICATION(S)

The present application claims priority to and incorporates by reference the entire contents of Japanese Patent Application No. 2019-068198 filed in Japan on Mar. 29, 2019, Japanese Patent Application No. 2019-198484 filed in Japan on Oct. 31, 2019, and Japanese Patent Application No. 2019-225516 filed in Japan on Dec. 13, 2019.

FIELD

Embodiments of the disclosure relate to a water area apparatus.

BACKGROUND

Conventionally, there has been known a toilet apparatus that is a kind of water area apparatus causing a motor to drive a pump so as to supply flush water to a toilet stool (see Japanese Patent Application Laid-open No. 2015-190269, for example).

Additionally, there has been known an apparatus that supplies, via a Power Factor Correction (PFC) circuit and an inverter circuit, electric power output from an Alternating-Current (AC) power supply to a motor (see Japanese Patent Application Laid-open No. H10-201248, for example).

Incidentally, in addition to the motor that drives the pump, the toilet apparatus is provided with another electric device such as a motor that cases a washing nozzle to operate. Thus, in the toilet apparatus, there is considered that voltages to be applied to the motor for driving the pump and the other electric device are adjusted, by using an inverter circuit and the like, on the basis of the above-mentioned technology.

However, electric power of a motor needed for driving a pump is larger than electric power of the other electric device, and thus current flowing into the motor that drives the pump is large. Thus, there is desired a measure against a large current flowing through a wire that supplies electric power to a motor that drives a pump, and that flowing into the motor that drives the pump.

For example, heat dissipation amount of a motor that drives a pump is to be increased, diameters of wires are to be increased, and distance between the wires and distance to another member are to be increased. Thus, it is difficult to miniaturize a toilet apparatus that is a kind of water area apparatus.

It is an object of the embodiments to provide a miniaturized water area apparatus.

A water area apparatus according to an embodiment includes a first device; a second device whose power consumption is smaller than that of the first device; a Power Factor Correction (PFC) circuit that is connected to an Alternating-Current power supply, reduces harmonic current, and steps up a voltage to output the stepped-up voltage; and a regulator that is connected to the PFC circuit and steps down a voltage to obtain a constant voltage, wherein the voltage stepped up by the PFC circuit is applied to the first device, and the voltage stepped down by the regulator is applied to the second device.

The water area apparatus applies, to the first device, a voltage stepped up by the PFC circuit to be able to reduce current flowing into the first device, so that it is possible to miniaturize a member that evolves heat generated from the first device. Thus, diameters of wires through which current flows into the first device are able to be reduced, and distance between the wires and a distance to another member are able to be reduced, so that it is possible to achieve its miniaturization.

A constant voltage stepped down by the regulator is able to be applied to the second device whose power consumption is smaller than that of the first device, while applying voltage to the first device via the PFC circuit, so that it is possible to reduce consumption loss of electric power in the whole of the water area apparatus.

The first device is a motor that drives a pump for pressure-feeding flush water to a toilet body.

When the first device is a motor that drives a pump, the water area apparatus applies, to the motor, a voltage stepped up by the PFC circuit to be able to reduce current flowing into the motor, so that it is possible to miniaturize a member that evolves heat generated from the motor. Thus, diameters of wires through which current flows into the motor are able to be reduced, and a distance between the wires and a distance to another member are able to be reduced, so that it is possible to achieve its miniaturization.

The voltage of the AC power supply is stepped up by the PFC circuit and the stepped-up voltage is applied to the motor, and thus a voltage tolerance of the voltage to be applied to the motor is able to be reduced with respect to a voltage tolerance of the AC power supply. Thus, variation in pressurizing flush water by using the pump, in other words, variation in water pressure of the flush water is able to be reduced, so that it is possible to improve a washing performance.

The water area apparatus includes a detection unit that detects a rotation speed of the motor; and a control unit that controls output of the motor so that the detected rotation speed of the motor is close to a target rotation speed the motor.

The water area apparatus is capable of reducing variation in a rotation speed of the motor, so that it is possible to reduce variation in water pressure of flush water. Thus, it is possible to improve a washing performance.

The first device is a warm-water heater that heats washing water to be spouted from a private-part washing nozzle.

When the first device is a warm-water heater, the water area apparatus applies, to the warm-water heater, the voltage stepped up by the PFC circuit to be able to reduce current flowing into the warm-water heater, so that it is possible to miniaturize a member that evolves heat generated from a heater driving unit that drives the warm-water heater. Thus, diameters of wires through which current flows into the warm-water heater are able to be reduced, and a distance between the wires and a distance to another member are able to be reduced, so that it is possible to achieve its miniaturization.

The voltage of an AC power supply is stepped up by the PFC circuit and the stepped-up voltage is applied to the warm-water heater, and thus a voltage tolerance of the voltage to be applied to the warm-water heater is able to be reduced with respect to a voltage tolerance of the AC power supply. Thus, variation in heating by the warm-water heater is able to be reduced, so that it is possible to improve a heating performance.

The first device is a toilet-seat heater that heats a seating surface of a toilet seat.

When the first device is a toilet-seat heater, the water area apparatus applies, to the toilet-seat heater, a voltage stepped up by the PFC circuit to be able to reduce current flowing into the toilet-seat heater. Thus, diameters of wires through which current flows into the toilet-seat heater are able to be reduced, and a distance between the wires and a distance to another member are able to be reduced, so that it is possible to achieve its miniaturization.

The voltage of an AC power supply is stepped up by the PFC circuit and the stepped-up voltage is applied to the toilet-seat heater, and thus a voltage tolerance of the voltage to be applied to the toilet-seat heater is able to be reduced with respect to a voltage tolerance of the AC power supply. Thus, variation in heating by the toilet-seat heater is able to be reduced, so that it is possible to improve a heating performance.

SUMMARY

It is an object of the present invention to at least partially solve the problems in the conventional technology.

The above and other objects, features, advantages and technical and industrial significance of this invention will be better understood by reading the following detailed description of presently preferred embodiments of the invention, when considered in connection with the accompanying drawings.

DESCRIPTION OF EMBODIMENT(S)

Hereinafter, embodiments of a water area apparatus as disclosed in the present application will be described in detail, with reference to the accompanying drawings. Additionally, this invention is not limited by the embodiments as illustrated below.

First Embodiment

Recently, for a toilet apparatus that is a kind of water area apparatus, what is called, "Low Silhouette type" is employed in which a water storage tank is arranged at a low position so as to lower, caused by diversification of design and a saving of water, a height of an upper end of the water storage tank. In such a kind of toilet apparatus, further diversification of design is pursued, and further miniaturization is desired.

Such a kind of toilet apparatus includes a pump that pressure-feeds flush water stored in a water storage tank. Electric power is supplied from commercial power source (AC power supply) to the pump, and thus there presents variation in water pressure of the flush water pressure-fed from the pump due to, for example, a voltage tolerance of commercial power source depending on a geographical factor of a country or a region in which the toilet apparatus is used, and the like. In other words, there is generated variation in a washing performance of flush water.

In a conventional toilet apparatus, many parameters for controlling output of a pump are prepared, in order to reduce variation in its washing performance, in accordance with a voltage tolerance of, for example, a country or a region so as to stabilize output of the pump. However, in this case, a controller is to be designed in accordance with the voltage tolerance of commercial power source in the country or the region, and thus it is difficult to generalize the toilet apparatus.

In consideration of variation in water pressure of flush water, the pump of the conventional toilet apparatus may be provided with a surplus pressuring performance so as to overall increase the water pressure of flush water. However, in this case, the pump becomes large, and thus it is difficult to miniaturize the toilet apparatus.

In consideration of these points, a toilet apparatus 1, which is a water area apparatus according to a first embodiment, is configured to have the following configuration so as to execute a water spouting process.

Figure 1:
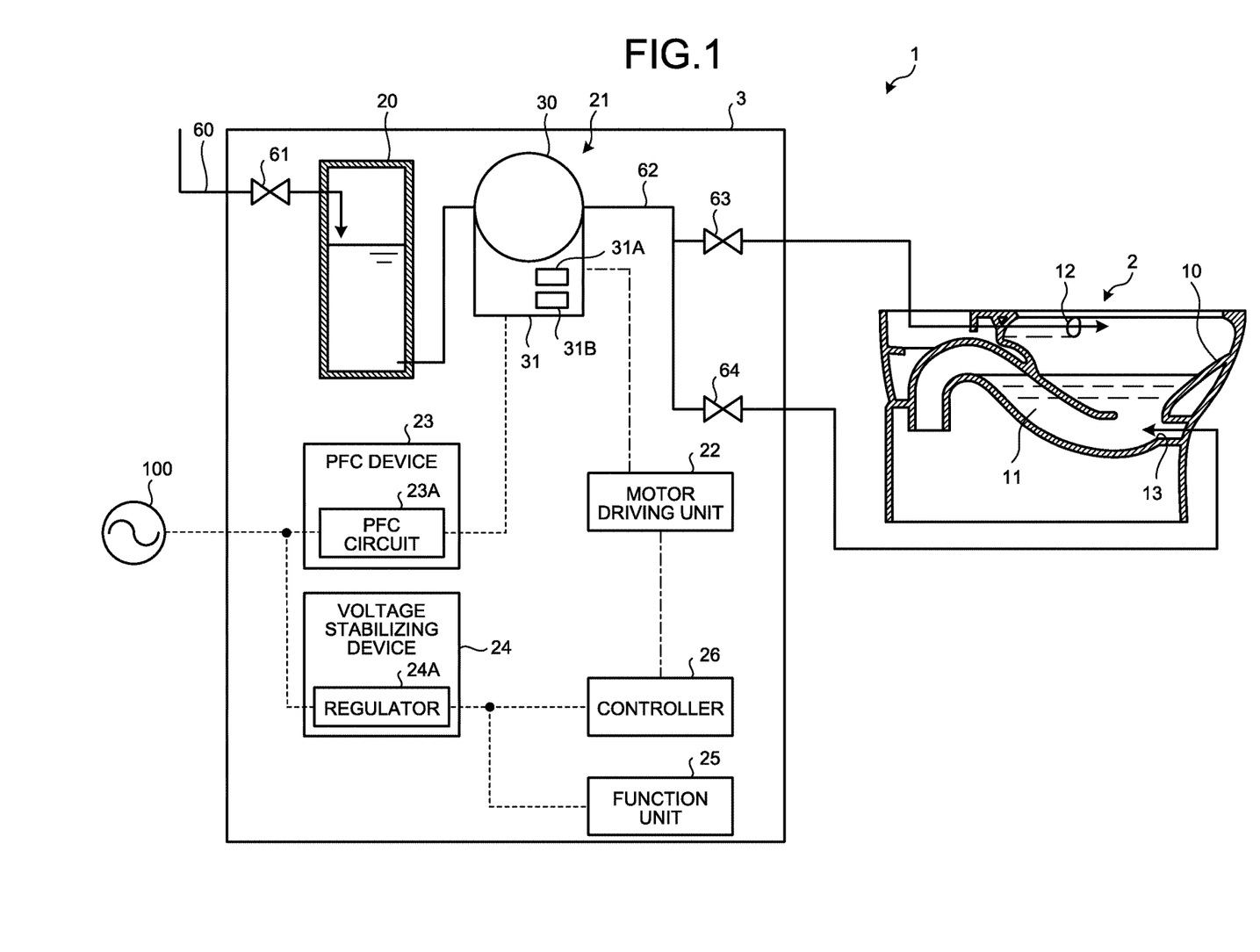
FIG. 1 is a diagram schematically illustrating a configuration of a water area apparatus according to a first embodiment.

The water area apparatus 1 according to the first embodiment will be explained with reference to FIG. 1. FIG. 1 is a diagram schematically illustrating a configuration of the water area apparatus (toilet apparatus) 1 according to the first embodiment. In FIG. 1, routes (pipes) through which tap water and flush water flow are indicated by using solid lines, electric power lines are indicated by using dashed lines, and lines through which a control signal and the like are transmitted are indicated by using alternate long and short dashed lines.

The toilet apparatus 1, which is a water area apparatus according to the first embodiment, includes a toilet body 2 and a toilet washing device 3.

The toilet body 2 is placed on, for example, a floor surface of a toilet room. The toilet body 2 includes a bowl part 10 that receives waste, and a drainage water trap pipeline 11 extending from a bottom part to the rear of the bowl part 10. In the bowl part 10, a rim water spout port 12 that rim-spouts water and a jet water spout port 13 that jet-spouts water are formed. The rim water spout port 12 is formed in the rear of an upper part of the bowl part 10 so as to spout flush water along an upper periphery of the bowl part 10.

The jet water spout port 13 is formed in the bottom part of the bowl part 10 so as to spout flush water toward the drainage water trap pipeline 11. When the jet water spout port 13 spouts flush water, the drainage water trap pipeline 11 is rapidly filled with the flush water, so that it is possible to rapidly generate the siphon effect. The drainage water trap pipeline 11 forms therein sealing water, and is communicated with a sewage pipe (not illustrated).

The toilet washing device 3 is arranged behind the toilet body 2. The toilet washing device 3 includes a water storage tank 20, a pump unit 21, a motor driving unit 22, a Power Factor Correction (PFC) device 23, a voltage stabilizing device 24, a function unit 25 (device), and a controller 26. Electric power is supplied to the toilet washing device 3 from an AC power supply 100, specifically, commercial power source.

Tap water is supplied to the water storage tank 20 via a water supplying pipe 60 so as to storage the supplied tap water as flush water. The water supplying pipe 60 is provided with an electromagnetic valve 61 that switches between supplying and stopping of tap water.

The pump unit 21 includes a pump 30 that pressure-feeds flush water, and a motor 31 that drives the pump 30. The pump 30 is provided to a supply pipe 62 for supplying flush water from the water storage tank 20 to the rim water spout port 12 and the jet water spout port 13. In other words, flush water pressurized by the pump 30 is spouted from the rim water spout port 12 and the jet water spout port 13.

The supply pipe 62 is provided with a first switching valve 63 that switches between spouting and stopping of flush water at the rim water spout port 12. The supply pipe 62 is provided with a second switching valve 64 that switches between spouting and stopping of flush water at the jet water spout port 13. The first switching valve 63 and the second switching valve 64 may be configured as a single switch valve.

Electric power is supplied from the AC power supply 100 to the motor 31 via the PFC device 23 so as to drive the pump 30. Specifically, voltage stepped up by the PFC device 23 is directly applied to the motor 31 and rotates its rotation shaft (not illustrated) so as to drive the pump 30. The motor 31 is provided with an electric-power controlling circuit 31A and a rotation-speed detecting circuit 31B (detection unit).

The electric-power controlling circuit 31A PWM-controls the motor 31 on the basis of a drive output signal output from the motor driving unit 22.

The rotation-speed detecting circuit 31B detects a rotation speed of the rotation shaft of the motor 31, and outputs a motor rotation-speed output signal. The rotation-speed detecting circuit 31B outputs, as the motor rotation-speed output signal, a signal detected by a sensor such as a hall element.

The PFC device 23 includes a PFC circuit 23A. The PFC circuit 23A is connected to the AC power supply 100, reduces harmonic current so as to improve a power factor, and further steps up the voltage. Specifically, the PFC circuit 23A reduces harmonic current and further steps up an input voltage with respect to electric power supplied from the AC power supply 100. Thus, a difference of voltage between the lower-limit value and the upper-limit value is reduced to be able to reduce the voltage tolerance. The voltage stepped up by the PFC device 23 is applied, as driving voltage, to the motor 31 of the pump unit 21. In other words, a driving voltage whose voltage tolerance is smaller than that of voltage of the AC power supply 100 is applied to the motor 31.

The voltage stabilizing device 24 includes a regulator 24A that steps down, to a constant voltage, a voltage of electric power supplied from the AC power supply 100. The regulator 24A is a circuit that includes a converter and an inverter. The regulator 24A converts an Alternating-Current voltage (AC voltage) into a Direct-Current voltage (DC voltage). The voltage stabilizing device 24 is arranged in parallel with the PFC device 23, for example. In other words, the regulator 24A is connected to the PFC circuit 23A in parallel, for example.

Note that there may be provided the two or more voltage stabilizing devices 24. In this case, each of the regulators 24A of the two or more voltage stabilizing device 24 may be connected to the corresponding PFC circuit 23A. Each of the regulators 24A is connected to the corresponding PFC circuit 23A in parallel, for example.

The function unit 25 is an electric device whose power consumption (needed electric power) is smaller than that of the motor 31 of the pump unit 21. A Direct-Current (DC) voltage stepped down by the voltage stabilizing device 24 is applied to the function unit 25.

The function unit 25 may be any of a private-part washing nozzle, an electric opening/closing device, and a deodorization device, for example. The private-part washing nozzle spouts washing water for washing a private part of a user. The electric opening/closing device is a device that automatically opens and closes a toilet lid and/or a toilet seat. The deodorization device is a device that aspirates air inside of the bowl part 10 so as to perform deodorization.

The function unit 25 includes, not limited to the aforementioned, an electric device to which voltage is applied via the voltage stabilizing device 24. For example, the function unit 25 includes actuators for driving the electromagnetic valve 61, the first switching valve 63, and the second switching valve 64.

The motor driving unit 22 outputs a drive output signal to the electric-power controlling circuit 31A of the motor 31 that drives the pump 30. The motor driving unit 22 outputs a motor rotation speed signal to the controller 26.

The controller 26 controls the pump unit 21 and the function unit 25. For example, the controller 26 controls output of the motor 31 of the pump unit 21, in other words, pressure-feeding of flush water by the pump 30, opening/closing of the electromagnetic valve 61, and operations of a private part nozzle.

The toilet apparatus 1, which is a water area apparatus according to the first embodiment, includes a first device and second devices whose power consumptions are smaller than that of the first device. In the first embodiment, the first device is the motor 31 for driving the pump 30, and the second devices are electric devices other than a motor and power consumptions of the second devices are smaller than that of the motor 31 (namely, first device). When being electric devices of a water guide channel system, the second devices may be, for example, the electromagnetic valve 61, and actuators of the switching valves 63 and 64.

Voltage stepped up by the PFC circuit 23A is applied to the first device (motor 31). Voltage stepped down by the regulator 24A is applied to the second devices.

Figure 2:
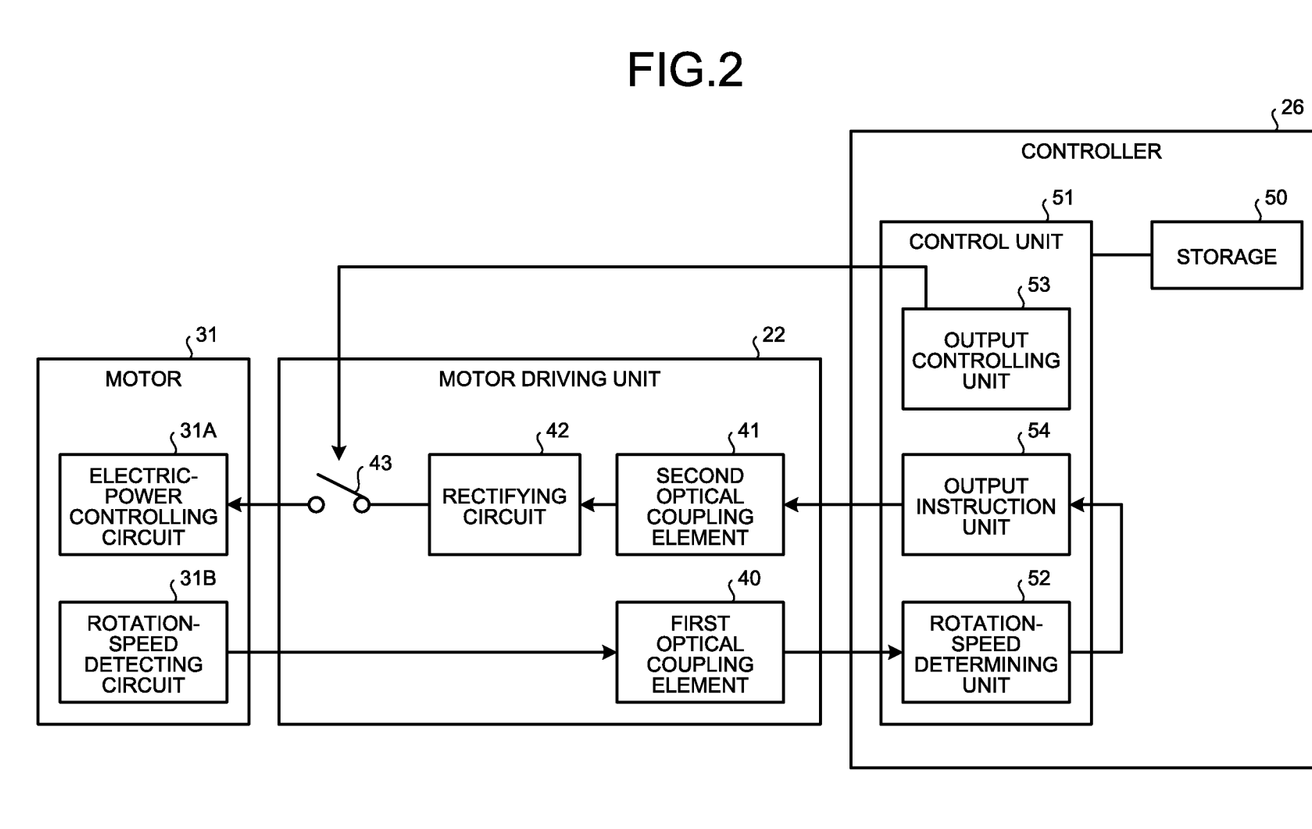
FIG. 2 is a block diagram illustrating a motor driving unit and a controller according to the first embodiment.

Next, details of the motor driving unit 22 and the controller 26 will be explained with reference to FIG. 2. FIG. 2 is a block diagram illustrating the motor driving unit 22 and the controller 26 according to the first embodiment.

The motor driving unit 22 includes a first optical coupling element 40, a second optical coupling element 41, a rectifying circuit 42, and a switch 43.

The first optical coupling element 40 once converts, into an optical signal, a motor rotation-speed output signal that is output from the rotation-speed detecting circuit 31B, and then converts again the optical signal into an electric signal, so as to output it as a motor rotation speed signal.

The second optical coupling element 41 once converts, into an optical signal, a drive output instruction signal that is output from the controller 26, and then converts again the optical signal into an electric signal, so as to output it as a drive output signal.

The rectifying circuit 42 is a Capacitor-Resistor (CR) circuit that includes a capacitor (not illustrated) and a resistor (not illustrated) so as to rectify a drive output signal having been converted by the second optical coupling element 41. The drive output signal having been rectified by the rectifying circuit 42 is output to the electric-power controlling circuit 31A of the motor 31.

The switch 43 is, for example, a switching optical coupling element, and is turned into an ON state or an OFF state on the basis of a switching signal output from an output controlling unit 53 of the controller 26. When the switch 43 is turned into an ON state, a drive output signal is output to the electric-power controlling circuit 31A of the motor 31.

When the switch 43 is turned into an OFF state, a drive output signal is not output to the electric-power controlling circuit 31A of the motor 31.

The controller 26 includes a storage 50 and a control unit 51. Herein, with respect to the controller 26, functions for controlling the pump unit 21 will be explained.

The storage 50 is realized by a semiconductor memory element such as a Random Access Memory (RAM) and a flash memory (Flash Memory), or a storage such as a hard disk and an optical disk.

The control unit 51 includes a rotation-speed determining unit 52, the output controlling unit 53, and an output instruction unit 54.

The control unit 51 is a controller (controller), and a Central Processing Unit (CPU) and/or a Micro Processing Unit (MPU) executes, by using a RAM as a work area, various programs stored in a storage device in the storage 50. Thus, the control unit 51 operates as the rotation-speed determining unit 52, the output controlling unit 53, and the output instruction unit 54. Any of the rotation-speed determining unit 52, the output controlling unit 53, and the output instruction unit 54 may be integrated with each other, or may be separately configured.

A motor rotation speed signal is input to the rotation-speed determining unit 52 from the motor driving unit 22 and the rotation-speed determining unit 52 computes a difference between a target motor rotation speed and an actual motor rotation speed that is based on the motor rotation speed signal. The target motor rotation speed is a rotation speed that is preliminary set in accordance with a spouting state of flush water, in other words, a pressure-feeding state of flush water by the pump 30. For example, the target motor rotation speed is set in accordance with a type (rim-spouting and jet-spouting) of spouting of flush water.

The output controlling unit 53 generates a switching signal for switching between an ON state and an OFF state of the switch 43, and outputs the generated switching signal.

When spouting flush water into the bowl part 10, for example, when being instructed by a user to execute a washing operation, or when detecting a user's separation to automatically execute washing, the output controlling unit 53 generates a switching signal for turning the switch 43 into an ON state. Hereinafter, the switching signal for turning the switch 43 into an ON state may be referred to as an "ON signal".

When generating an ON signal and then a preliminary-set predetermined washing time interval has elapsed, the output controlling unit 53 generates a switching signal for turning the switch 43 into an OFF state. Hereinafter, the switching signal for turning the switch 43 into an OFF state may be referred to as an "OFF signal".

The output instruction unit 54 generates a drive output instruction signal so that the computed difference is zero, in other words, an actual motor rotation speed coincides with or is close to a target motor rotation speed. Specifically, the output instruction unit 54 generates, by using feedback control, a drive output instruction signal so that an actual motor rotation speed coincides with or is close to a target motor rotation speed so as to control output of the motor 31. The output instruction unit 54 may combine therewith feedforward control to generate a drive output instruction signal.

Figure 3:
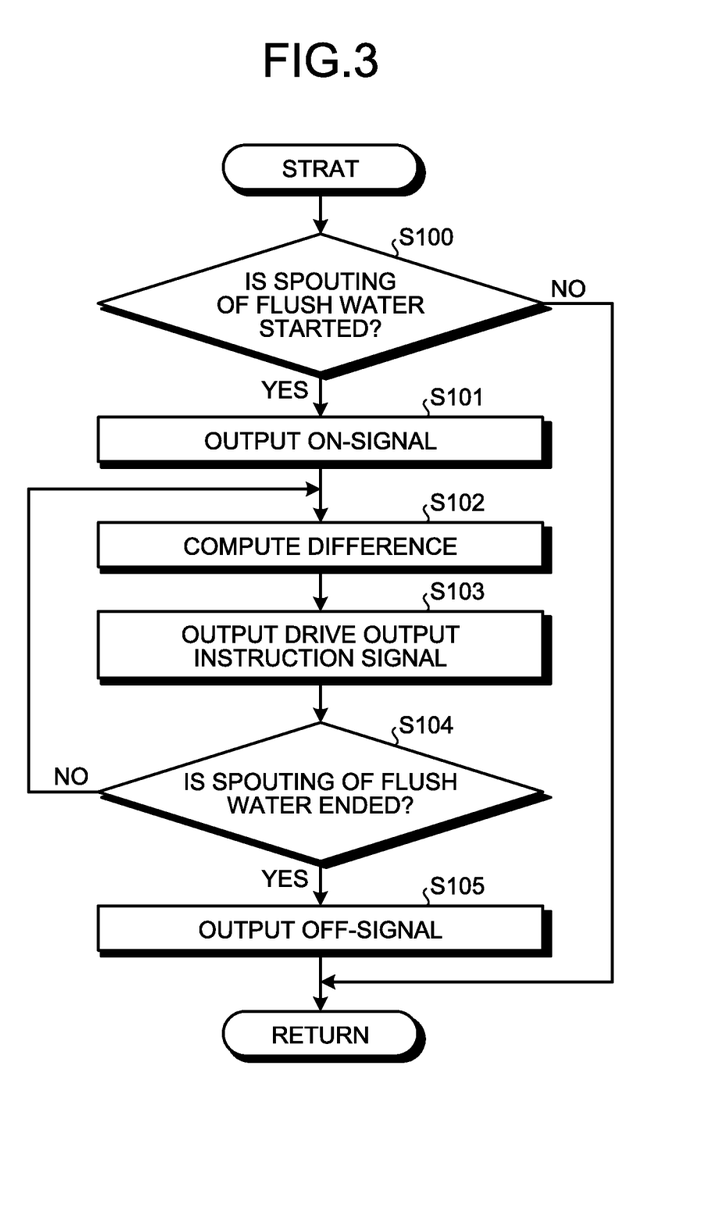
FIG. 3 is a flowchart illustrating a water spouting process according to the first embodiment.

Next, a water spouting process according to the first embodiment will be explained with reference to FIG. 3. FIG. 3 is a flowchart illustrating a water spouting process according to the first embodiment.

When starting to spout flush water into the bowl part 10 (Step S100: Yes), the controller 26 generates and outputs an ON signal (Step S101). When not starting to spout flush water into the bowl part 10 (Step S100: No), the controller 26 ends the present processing.

The controller 26 computes, on the basis of the input motor rotation speed signal, a difference between an actual motor rotation speed and a target motor rotation speed (Step S102). The controller 26 generates, by using feedback control, a drive output instruction signal so that the actual motor rotation speed coincides with or is close to the target motor rotation speed, and outputs the generated drive output instruction signal (Step S103).

When not ending spouting of flush water, specifically, when a predetermined washing time interval has not elapsed since the spouting of flush water was started (Step S104: No), the controller 26 returns to the process of Step S102 so as to continue to output the above-mentioned drive output instruction signal.

When ending spouting of flush water, specifically, when the predetermined washing time interval has elapsed since the spouting of flush water was started (Step S104: Yes), the controller 26 generates and outputs an OFF signal (Step S105).

Next, effects of the toilet apparatus 1, which is a water area apparatus according to the first embodiment, will be explained.

The toilet apparatus 1 steps up voltage while reducing harmonic current by using the PFC circuit 23A that is connected to the AC power supply 100. The toilet apparatus 1 applies the stepped-up voltage to the motor 31 that drives the pump 30 for pressure-feeding flush water.

The toilet apparatus 1 directly applies, to the motor 31, the voltage stepped up by the PFC circuit 23A to be able to reduce current flowing into the motor 31. Thus, the toilet apparatus 1 is capable of miniaturizing a member that evolves heat generated by the motor 31, for example. The toilet apparatus 1 is capable of reducing diameters of wires through which current flows into the motor 31, distance between the wires, and a distance to another member. Thus, it is possible to miniaturize the pump unit 21, thereby leading to miniaturizing the toilet apparatus 1. Moreover, the toilet apparatus 1 applies, via the PFC circuit 23A, voltage to the motor 31, so that it is possible to reduce harmonic current.

When the toilet apparatus 1 is miniaturized, diversification of design is able to be improved, thereby leading to improving its design.

The toilet apparatus 1 steps up a voltage of commercial power source (AC power supply 100) by using the PFC circuit 23A and applies the stepped-up voltage to the motor 31. Thus, the toilet apparatus 1 is capable of reducing a difference between a lower-limit value and an upper-limit value of voltage to be applied to the motor 31 with respect to a voltage tolerance of the commercial power source, so that it is possible to reduce the voltage tolerance. Thus, the toilet apparatus 1 is capable of reducing variation in water pressure of flush water pressure-fed by the pump 30.

Thus, the toilet apparatus 1 is capable of reducing variation in a washing performance of flush water caused by a voltage tolerance of commercial power source in a country or a region in which the toilet apparatus 1 is used. Moreover, the toilet apparatus 1 is capable of reducing variation in the washing performance without preparing many control parameters corresponding to voltage tolerances of commercial power sources in countries or regions, to be able to facilitate designing of the controller 26, so that it is possible to generalize the toilet apparatus 1.

The toilet apparatus 1 steps down a voltage by using the regulator 24A that is connected in parallel with the PFC circuit 23A so as to obtain a constant voltage. The toilet apparatus 1 applies, to the function unit 25 whose power consumption is smaller than that of the motor 31, the voltage stepped down by the regulator 24A.

Thus, the toilet apparatus 1 is capable of applying the stepped-up voltage to the motor 31 and applying the constant stepped-down voltage to the function unit 25, so that it is possible to reduce consumption loss of electric power in the whole of the toilet apparatus 1.

A voltage tolerance of the voltage stepped up by the PFC circuit 23A is able to be reduced by the stepping-up, however, it is in a rather fluctuating state compared with a voltage rectified by the regulator 24A or the like. In other words, the voltage stepped up by the PFC circuit 23A is a voltage having a predetermined ripple width.

On the other hand, the toilet apparatus 1 controls output of the motor 31 so that an actual motor rotation speed is close to a target motor rotation speed.

Thus, the toilet apparatus 1 is capable of reducing variation in output from the motor 31 to which voltage stepped up by the PFC circuit 23A is applied, in other words, variation in a rotation speed of the motor 31. Therefore, the toilet apparatus 1 is capable of reducing variation in water pressure of flush water pressure-fed by the pump 30. Thus, the toilet apparatus 1 is capable of improving its washing performance.

Moreover, the toilet apparatus 1 is capable of improving its washing performance without providing any surplus pressuring performance to the pump 30. Thus, it is possible to miniaturize the toilet apparatus 1.

In the above-mentioned first embodiment, there has been explained, as one example, the toilet apparatus 1 that spouts, to the bowl part 10, flush water pressure-fed by the pump 30; however, not limited thereto. The toilet apparatus 1 may have, what is called, a hybrid-type that spouts flush water pressure-fed by the pump 30 from the jet water spout port 13 and further spouts tap water from the rim water spout port 12.

Second Embodiment

Figure 4:
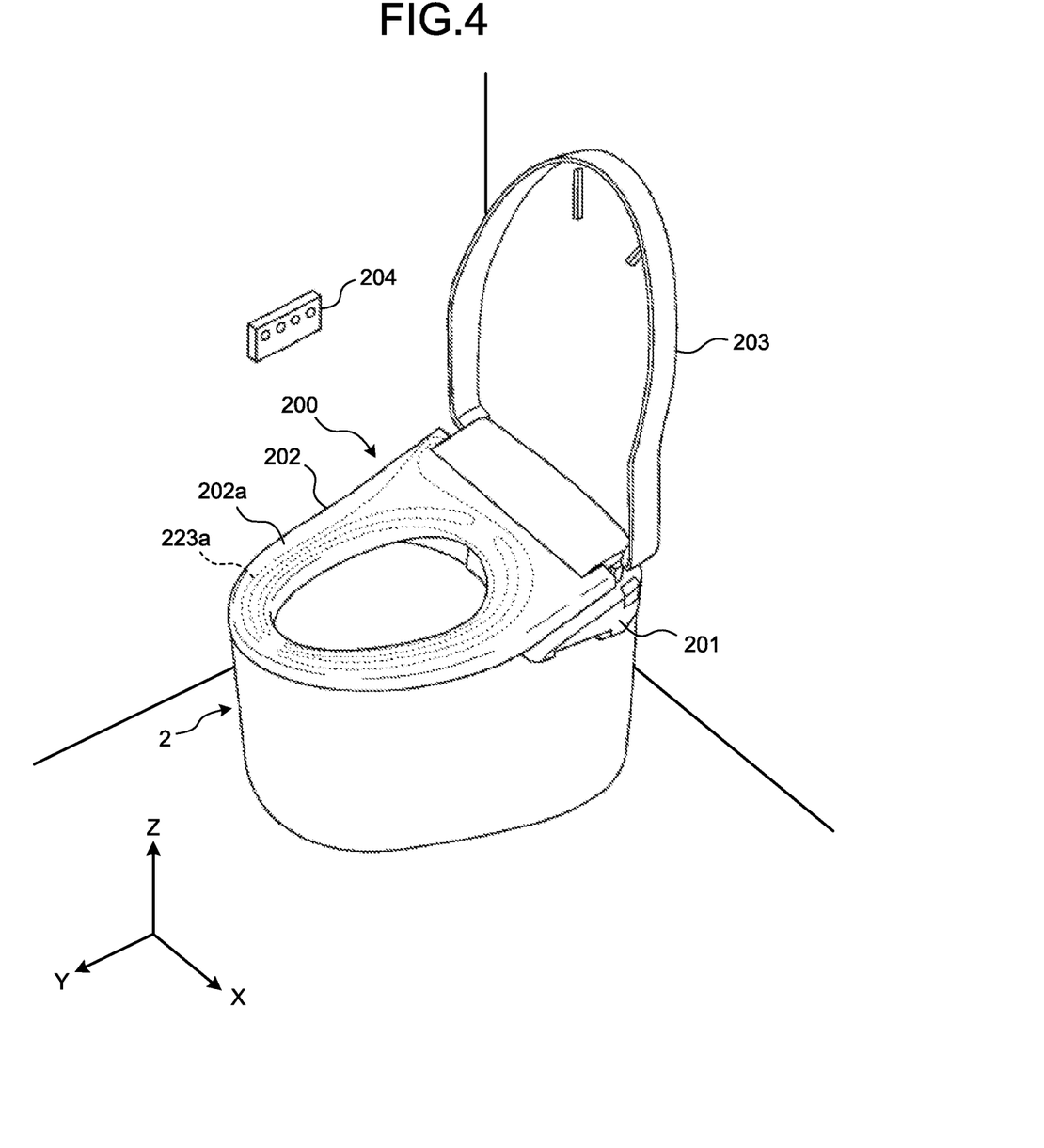
FIG. 4 is a diagram schematically illustrating a water area apparatus according to a second embodiment.

Next, a water area apparatus 200 according to a second embodiment will be explained with reference to FIGS. 4 to 6. FIG. 4 is a diagram schematically illustrating the water area apparatus (toilet-seat apparatus) 200 according to the second embodiment. In FIG. 4, there are illustrated a state where a toilet seat 202 to be mentioned later is closed, and a state where a toilet lid 203 to be mentioned later is opened.

In FIG. 4, there is illustrated a three-dimensional orthogonal coordinate system including the Z-axis whose positive direction is the vertically upward direction. For convenience of explanation, the positive direction of the X-axis is prescribed as a right direction, the negative direction of the X-axis is prescribed as a left direction, the positive direction of the Y-axis is prescribed as a forward direction, and the negative direction of the Y-axis is prescribed as a backward direction; and the X-axis direction may be referred to as a left-right direction, the Y-axis direction may be referred to as a front-back direction, and the Z-axis direction may be referred to as an up-and-down direction.

Figure 5:
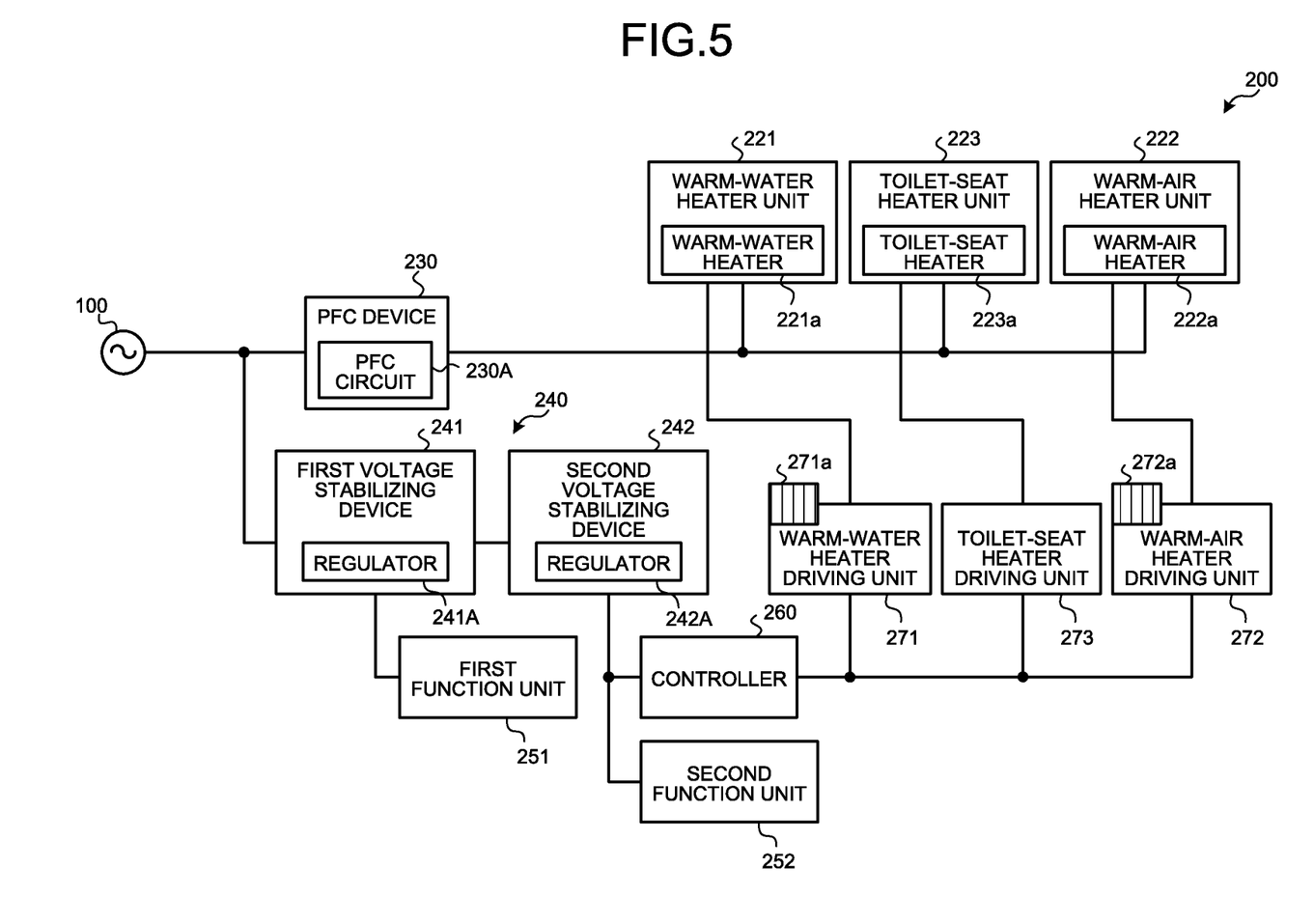
FIG. 5 is a diagram schematically illustrating a configuration of the water area apparatus according to the second embodiment.

FIG. 5 is a diagram schematically illustrating a configuration of the water area apparatus (toilet-seat apparatus) 200 according to the second embodiment. FIG. 6 is a block diagram illustrating heater driving units (warm-water heater driving unit 271, warm-air heater driving unit 272, and toilet-seat heater driving unit 273) and a controller 260 according to the second embodiment.

In the second embodiment to be described below, there are provided heaters (warm-water heater 221a, warm-air heater 222a, and toilet-seat heater 223a) to be mentioned later as the first devices. Note that, in the following explanation, parts described in the second embodiment that are similar to or identical to those described in the above-mentioned first embodiment are represented with the same reference symbols and the description is omitted appropriately.

As illustrated in FIG. 4, the toilet-seat apparatus 200, which is a water area apparatus according to the second embodiment, is arranged at a rear portion of an upper surface of the above-mentioned toilet body 2. The toilet-seat apparatus 200 includes a main body part 201, the toilet seat 202, and the toilet lid 203. Each of the toilet seat 202 and the toilet lid 203 is pivotally supported so as to be freely opened and closed with respect to the main body part 201. The toilet lid 203 covers, in its closed state, the upward of the toilet seat 202. The toilet lid 203 may be omitted from the toilet-seat apparatus 200.

The toilet-seat apparatus 200 has a washing function for washing a private part of a user sitting on the toilet seat 202, from among the above-mentioned function units 25 (see FIG. 1). The toilet-seat apparatus 200 further has a drying function for drying a private part of a user sitting on the toilet seat 202 and a heating function for heating a seating surface 202a of the toilet seat 202.

For example, when the toilet-seat apparatus 200 is going to exerting a washing function, a user operates an operation device 204 arranged on a wall surface of a toilet room so as to cause a washing nozzle (not illustrated) to advance to the inside of the bowl part 10 of the toilet body 2, and further causes a water spout port (not illustrated) of the washing nozzle to eject washing water so as to wash a private part of the user. In the washing function, the toilet-seat apparatus 200 causes the water spout port to eject washing water having been heated by the heater (warm-water heater) 221a (see FIG. 6).

When the toilet-seat apparatus 200 is going to exerting the drying function, for example, a user operates the above-mentioned operation device 204 to spray air (warm air) heated by the heater (warm-air heater) 222a (see FIG. 6) to his/her private part.

In order to exert the heating function, the main body part 201 of the toilet-seat apparatus 200 includes in the toilet seat 202 the heater (toilet-seat heater) 223a that heats the seating surface 202a. Specifically, a metal member is arranged in the toilet seat 202 as the toilet-seat heater 223a. The metal member is arranged along a periphery of an opening of the toilet seat 202. Electric power is supplied to the toilet-seat heater 223a as described above so that the toilet seat is heated.

Any of a tubing heater, a sheath heater, a halogen heater, a carbon heater, and the like may be employed for the toilet-seat heater 223a. The metal member of the toilet-seat heater 223a is made of aluminum, copper, or the like. The metal member of the toilet-seat heater 223a may have any of various shapes such as sheet shape, wire shape, and mesh shape.

As illustrated in FIG. 5, the main body part 201 (see FIG. 4) of the toilet-seat apparatus 200 includes a PFC device 230, a voltage stabilizing device 240, the controller 260, similarly to the above-mentioned first embodiment. To the toilet-seat apparatus 200, electric power is supplied from the AC power supply 100, specifically, commercial power source.

The main body part 201 of the toilet-seat apparatus 200 includes heater units (warm-water heater unit 221, warm-air heater unit 222, and toilet-seat heater unit 223) with which heaters (warm-water heater 221a, warm-air heater 222a, and toilet-seat heater 223a) are integrated so as to exert the above mentioned washing function, drying function, and heating function.

Electric power is supplied, via the PFC device 230, to the heaters 221a, 222a, and 223a from the AC power supply 100 so as to heat (warm) a to-be-heated part (for example, seating surface 202a of toilet seat 202 in case of toilet-seat heater 223a). Voltage stepped up by the PFC device 230 is directly applied to each of the warm-water heater 221a, the warm-air heater 222a, and the toilet-seat heater 223a.

The PFC device 230 includes a PFC circuit 230A. The PFC circuit 230A is connected to the AC power supply 100 so as to reduce harmonic current while improving a power factor, and further steps up the voltage.

Specifically, the PFC circuit 230A reduces harmonic current in electric power supplied from the AC power supply 100, and steps up the input voltage. Thus, it is possible to reduce a difference between a lower-limit value and an upper-limit value of the voltage, thereby leading to reducing its voltage tolerance.

The voltage stepped up by the PFC device 230 is applied, as driving voltage, to each of the heaters 221a, 222a, and 223a. In other words, a driving voltage whose voltage tolerance is smaller than that of voltage of the AC power supply 100 is applied to each of the heaters 221a, 222a, and 223a.

A first voltage stabilizing device 241 includes a regulator 241A that steps down, into a constant voltage, voltage of electric power supplied from the AC power supply 100. The regulator 241A is a circuit including a converter and an inverter. The regulator 241A is connected to the PFC circuit 230A. The regulator 241A converts an AC voltage into a DC voltage.

Similarly to the above-mentioned first voltage stabilizing device 241, a second voltage stabilizing device 242 includes a regulator 242A that steps down, into a constant voltage, voltage of electric power supplied from the AC power supply 100. The regulator 242A is a circuit that includes a converter and/or an inverter. The regulator 242A is connected to the PFC circuit 230A. The regulator 242A converts an AC voltage into a DC voltage.

In the second embodiment, a plurality of voltage stabilizing devices (two devices, namely, first voltage stabilizing device 241 and second voltage stabilizing device 242) is provided; however, not limited thereto, a single voltage stabilizing device alone may be provided.

A first function unit 251 corresponds to second devices with respect to first devices in the second embodiment that are the warm-water heater 221a, the warm-air heater 222a, and the toilet-seat heater 223a; and the second devices are electric devices whose power consumptions (needed electric power) are smaller than those of the heaters 221a, 222a, and 223a (first devices). To the first function unit 251, a DC voltage that is stepped down by the first voltage stabilizing device 241 is applied.

A second function unit 252 corresponds to the second devices with respect to the first devices in the second embodiment that are the warm-water heater 221a, the warm-air heater 222a, and the toilet-seat heater 223a; and the second devices are electric devices whose power consumptions (needed electric power) are smaller than those of the heaters 221a, 222a, and 223a (namely, first devices). To the second function unit 252, a DC voltage that is stepped down by the second voltage stabilizing device 242 is applied.

The first function unit 251 and the second function unit 252 include, for example, a private-part washing nozzle, an electric opening/closing device, and a deodorization device. The private-part washing nozzle spouts washing water for washing a private part of a user. The electric opening/closing device is a device that automatically opens or closes a toilet lid and/or a toilet seat. The deodorization device is a device that aspirates air inside the bowl part 10 (see FIG. 4) so as to perform deodorization.

The first function unit 251 and the second function unit 252 are not limited to the above-mentioned devices, but include an electric device to which voltage is applied via the first voltage stabilizing device 241 and/or the second voltage stabilizing device 242. For example, the first function unit 251 and the second function unit 252 include actuator for causing the electromagnetic valve 61, the first switching valve 63, and the second switching valve 64 to operate.

The warm-water heater driving unit 271 includes a heatsink 271a and a warm-water heater driving circuit (not illustrated). The warm-water heater driving circuit outputs a driving electric power signal to an electric-power controlling circuit (not illustrated) of the warm-water heater 221a. The warm-water heater driving circuit outputs a temperature signal to the controller 260.

The warm-air heater driving unit 272 includes a heatsink 272a and a warm-air heater driving circuit (not illustrated). The warm-air heater driving circuit outputs a driving electric power signal to an electric-power controlling circuit (not illustrated) of the warm-air heater 222a. The warm-air heater driving circuit outputs a temperature signal to the controller 260.

The toilet-seat heater driving unit 273 includes a toilet-seat heater driving circuit (not illustrated). The toilet-seat heater driving circuit outputs a driving electric power signal to an electric-power controlling circuit (not illustrated) of the toilet-seat heater 223a. The toilet-seat heater driving circuit outputs a temperature signal to the controller 260.

The controller 260 controls the heater units and the function units. For example, the controller 260 controls output of each of the heaters, opening/closing of the electromagnetic valve 61 (see FIG. 1), operations of the washing nozzle, etc.

Incidentally, as described above, the toilet-seat apparatus 200, which is a water area apparatus according to the second embodiment, includes the first devices and the second devices whose power consumptions are smaller than those of the first device. In the second embodiment, the first devices are the warm-water heater 221a, the warm-air heater 222a, and the toilet-seat heater 223a, and the second devices are electric devices other than the heaters 221a, 222a, and 223a, and power consumptions of the second devices are smaller than those of the heaters 221a, 222a, and 223a (namely, first devices).

Next, details of the heater driving unit (warm-water heater driving unit 271) and the controller 260 will be explained with reference to FIG. 6.

Figure 6:
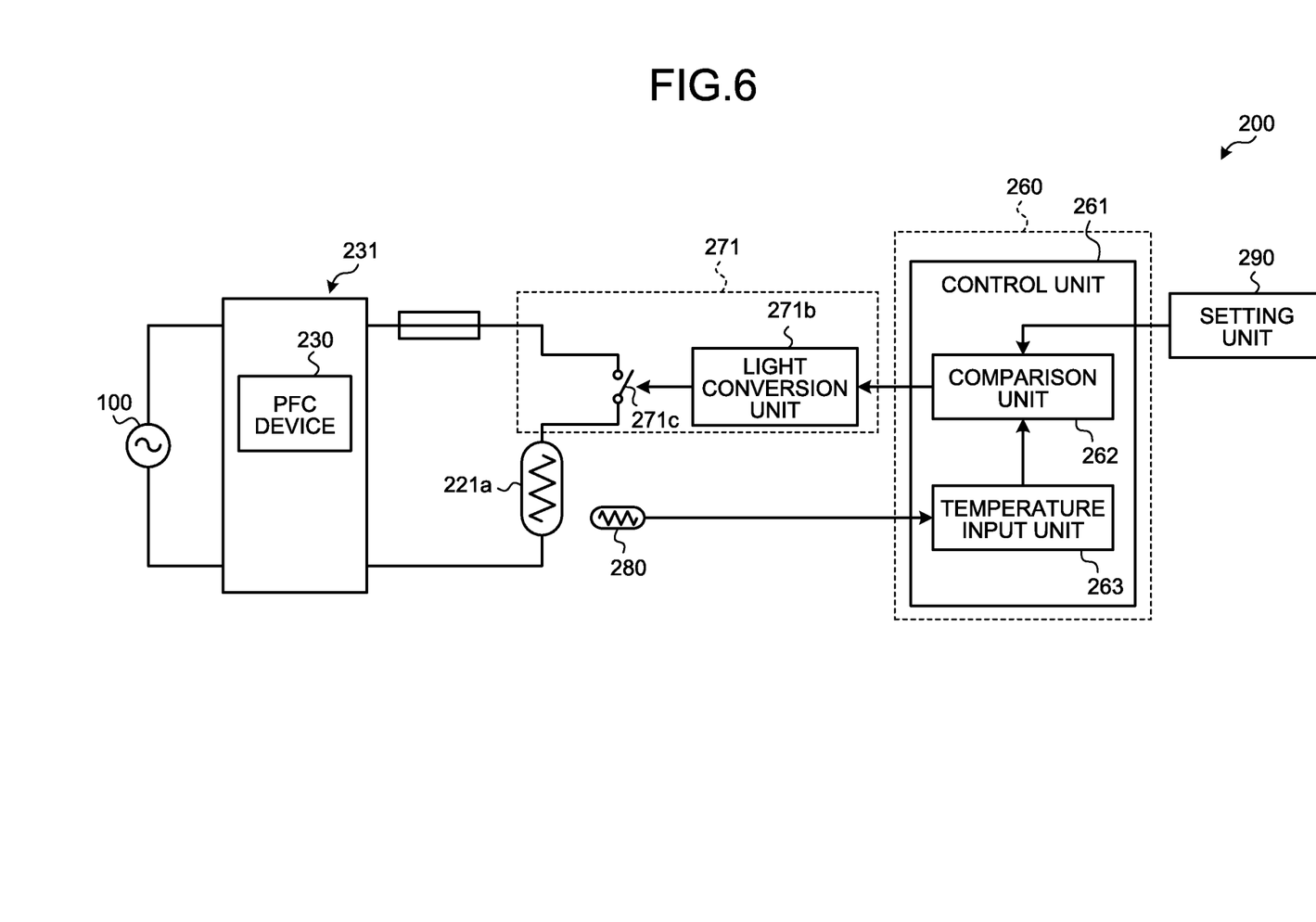
FIG. 6 is a block diagram illustrating heater driving units and a controller according to the second embodiment.

As illustrated in FIG. 6, a step-up unit 231 having a PFC function is connected to the AC power supply 100. The step-up unit 231 having a PFC function reduces harmonic current by using the PFC device 230 so as to improve a power factor, and steps up the voltage. The voltage stepped up by the PFC device 230 is applied to the warm-water heater 221a as a driving voltage.

The controller 260 includes a control unit 261. A function for controlling the warm-water heater unit 221 of the controller 260 will be explained. The control unit 261 includes a temperature input unit 263 and a comparison unit 262.

In the control unit 261, for example, a Central Processing Unit (CPU), a Micro Processing Unit (MPU), and the like execute, by using a RAM as a work area, various programs stored in a storage device of the control unit 261, for example. Thus, the control unit 261 functions as the temperature input unit 263 and the comparison unit 262. The storage device is realized by a semiconductor memory element such as a Random Access Memory (RAM) and a flash memory (Flash Memory), or a storage such as a hard disk and an optical disk.

To the temperature input unit 263, a temperature signal (temperature) is input from a temperature sensor (for example, thermistor) 280 that measures the temperature of washing water in a water storage tank (not illustrated) storing therein washing water to be spouted from a washing nozzle. The temperature input unit 263 outputs the input temperature to the comparison unit 262.

The comparison unit 262 compares, for example, the input temperature with, for example, a set temperature having been set in a setting unit 290 by an operation of a user. The comparison unit 262 outputs, on the basis of the comparison result, a control signal to a light conversion unit 271b of the heater driving unit (warm-water heater driving unit 271).

The light conversion unit 271b converts, into an optical signal, the control signal input from the comparison unit 262, and converts again the optical signal into an electric signal, so as to output it as a temperature controlling signal. The light conversion unit 271b outputs, to a switch 271c, the temperature controlling signal (switching signal between ON-state and OFF-state). The switch 271c is a switching optical coupling element, for example, and turns into an ON state or an OFF state on the basis of the switching signal output from the comparison unit 262 of the control unit 261.

In other words, the comparison unit 262 generates a switching signal for switching between an ON state and an OFF state of the switch 271c, and outputs the generated switching signal. The comparison unit 262 detects whether or not the input temperature signal (temperature) reaches a set temperature having been set in the setting unit 290. When a temperature input from the temperature sensor 280 reaches a set temperature in a heating process of washing water, the comparison unit 262 turns the switch 271c into an OFF state. In other words, heating of washing water by the warm-water heater 221a is stopped.

When a temperature input from the temperature sensor 280 has not yet reached the set temperature in the heating process of washing water, the comparison unit 262 turns the switch 271c into an ON state. In other words, heating of washing water by the warm-water heater 221a is continued.

Next, effects of the toilet-seat apparatus 200, which is a water area apparatus according to the second embodiment, will be explained.

The toilet-seat apparatus 200 reduces harmonic current by using the PFC circuit 230A connected to the AC power supply 100, and further steps up the voltage. The toilet-seat apparatus 200 applies the stepped-up voltage to the warm-water heater 221a that heats washing water to be spouted from a private-part washing nozzle, the warm-air heater 222a that heats air to be sprayed for drying a private part, and the toilet-seat heater 223a that heats the seating surface 202a of the toilet seat 202.

The toilet-seat apparatus 200 directly applies, to the heaters 221a, 222a, and 223a, a voltage stepped up by the PFC circuit 230A to be able to reduce current flowing into the heaters 221a, 222a, and 223a. Thus, it is possible to miniaturize heat dissipation members such as the heatsinks 271a and 272a of the heater driving units (warm-water heater driving unit 271 and warm-air heater driving unit 272). Moreover, the toilet-seat apparatus 200 is capable of reducing diameters of wires through which current flows into the heaters 221a, 222a, and 223a, a distance between the wires, and a distance to another member. Thus, the heater units 221, 222, and 223 and the heater driving units 271, 272, and 273 are able to be miniaturized, so that it is possible to miniaturize the toilet-seat apparatus 200. Furthermore, the toilet-seat apparatus 200 applies voltage to the motor 31 via the PFC circuit 230A to be able to reduce harmonic current.

When the toilet-seat apparatus 200 is miniaturized, diversification of design is able to be improved, thereby leading to improving its design.

The toilet-seat apparatus 200 steps up voltage of commercial power source (AC power supply 100) by using the PFC circuit 230A, and applies the stepped-up voltage to the heaters 221a, 222a, and 223a. Thus, the toilet-seat apparatus 200 is capable of reducing a difference between a lower-limit value and an upper-limit value of the voltage to be applied to each of the heaters 221a, 222a, and 223a with respect to a voltage tolerance of the commercial power source. Thus, the toilet-seat apparatus 200 is capable of reducing variation in heating of a to-be-heated part.

Therefore, the toilet-seat apparatus 200 is capable of reducing variation in a heating performance caused by a voltage tolerance of commercial power source in a country or a region in which the toilet-seat apparatus 200 is used. Moreover, the toilet-seat apparatus 200 is capable of reducing variation in a heating performance without preparing many control parameters corresponding to voltage tolerances of commercial power sources in countries or regions, to be able to facilitate designing of the controller 260, so that it is possible to generalize the toilet-seat apparatus 200.

The toilet-seat apparatus 200 steps down voltage by using the regulators 241A and 242A connected to the PFC circuit 230A to obtain a constant voltage. The toilet-seat apparatus 200 applies, to the first function unit 251 and the second function unit 252 whose power consumptions are smaller than those of the heaters 221a, 222a, and 223a; the voltage stepped down by the regulators 241A and 242A.

Thus, the toilet-seat apparatus 200 is capable of applying a stepped-up voltage to the heaters 221a, 222a, and 223a, and is further capable of applying a stepped-down constant voltage to the first function unit 251 and the second function unit 252, so that it is possible to reduce consumption loss of electric power in the whole of the toilet-seat apparatus 200.

Figure 7:
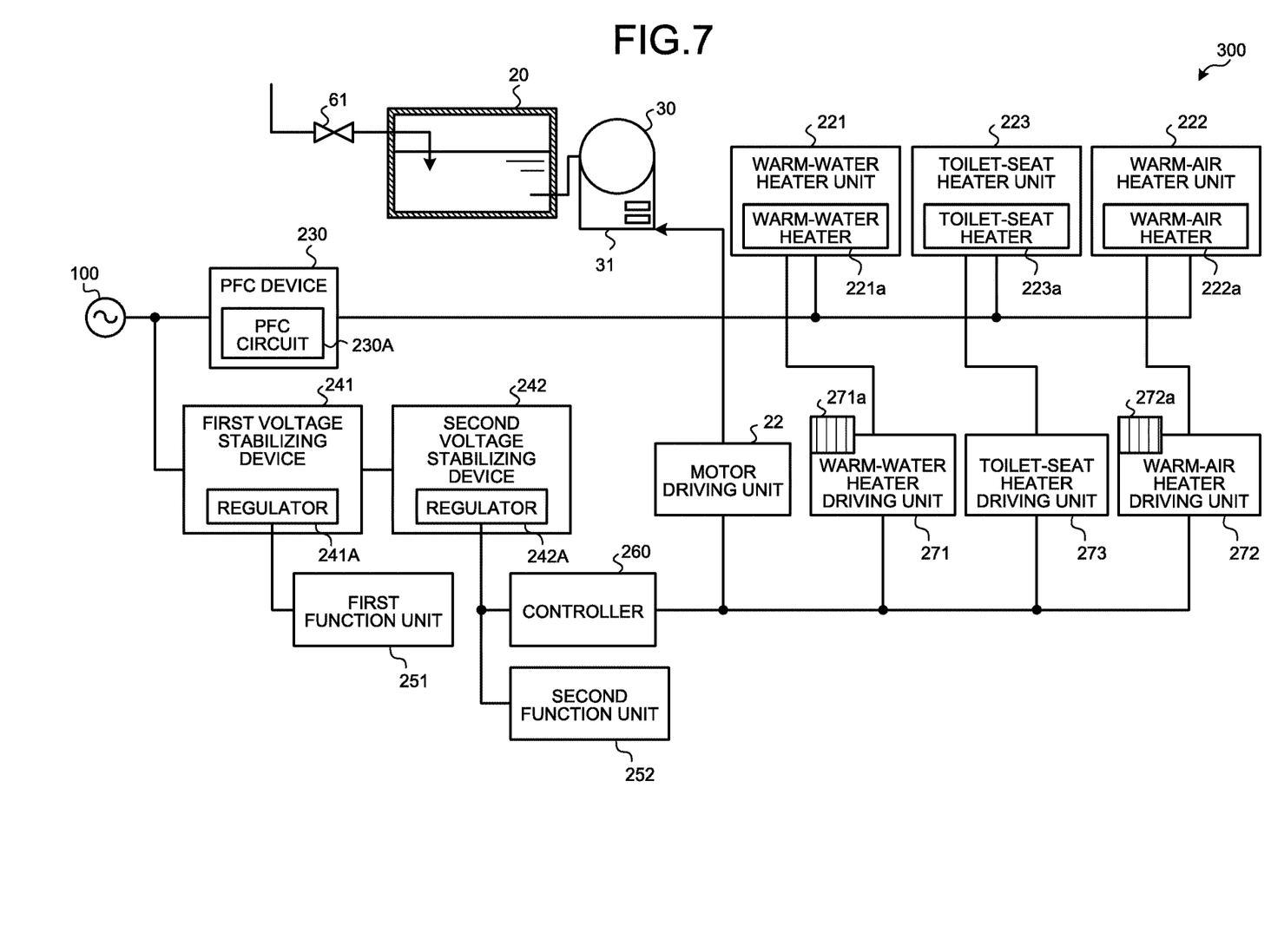
FIG. 7 is a diagram schematically illustrating another example of the water area apparatus.

In the above-mentioned first embodiment, the first device is the motor 31 for driving the pump 30, and in above-mentioned second embodiment, the first devices are the warm-water heater 221a, the warm-air heater 222a, and the toilet-seat heater 223a; however, for example, as illustrated in FIG. 7, a water area apparatus 300 may include, as the first devices, the motor 31, the warm-water heater 221a, the warm-air heater 222a, and the toilet-seat heater 223a.

In the above-mentioned second embodiment, the warm-water heater 221a, the warm-air heater 222a, and the toilet-seat heater 223a are the first devices; however, for example, at least one of the three heaters 221a, 222a, and 223a may be the first device.

In the toilet apparatus 1 that is a water area apparatus, the second devices whose power consumptions (for example, DC 5 V, 24 V) are smaller than those of the first devices include, with respect to a water guide channel system, for example, a float switch, a nozzle motor, a flow regulating/flow-path switching motor, the electromagnetic valve 61 (see FIG. 1), the warm-water sensor 280 (see FIG. 6), a limit thermistor, and an auto cleaning unit.

The second device includes, with respect to a wind system, for example, a warm air thermistor and fan motors for deodorization, warm air, and air ventilation. The second device includes, with respect to a toilet seat system, for example, a toilet seat thermistor. The second device includes, with respect to a sensor system, for example, a seating detection sensor, a human-body detecting sensor, a toilet seat sensor, and an opening/closing detection sensor for soft-close of a toilet lid. The second device includes, with respect to a display system, for example, a display board and a buzzer. The second device includes, with respect to an electric powered opening/closing system, for example, a motor for electric powered opening/closing. In addition to the aforementioned, the second device includes a room air temperature sensor, a removal sensor, and the like.

The water area apparatus may include a faucet apparatus and a bathroom apparatus in addition to the above-mentioned toilet apparatus 1 and the above-mentioned toilet-seat apparatus 200.

According to one aspect of the embodiments, it is possible to miniaturize a water area apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A water area apparatus comprising:
   a first device;
   a second device whose power consumption is smaller than that of the first device;
   a power factor correction (PFC) circuit that is connected to an alternating-current power supply, reduces harmonic current, and steps up a voltage to output the stepped-up voltage; and
   a regulator that is connected to the PFC circuit and steps down a voltage to obtain a constant voltage, wherein
   the voltage stepped up by the PFC circuit is applied to the first device, and
   the voltage stepped down by the regulator is applied to the second device.

2. The water area apparatus according to claim 1, wherein the first device is a motor that drives a pump for pressure-feeding flush water to a toilet body.

3. The water area apparatus according to claim 2, further comprising:
   a detection unit that detects a rotation speed of the motor; and
   a control unit that controls output of the motor so that the detected rotation speed of the motor is close to a target rotation speed the motor.

4. The water area apparatus according to claim 1, wherein the first device is a warm-water heater that heats washing water to be spouted from a private-part washing nozzle.

5. The water area apparatus according to claim 1, wherein the first device is a toilet-seat heater that heats a seating surface of a toilet seat.

* * * * *